United States Patent
Wallin et al.

(10) Patent No.: US 11,055,541 B2
(45) Date of Patent: *Jul. 6, 2021

(54) VEHICLE LANE MARKING AND OTHER OBJECT DETECTION USING SIDE FISHEYE CAMERAS AND THREE-FOLD DE-WARPING

(71) Applicant: Volvo Car Corporation, Gothenburg (SE)

(72) Inventors: Andreas Wallin, Gothenburg (SE); Sihao Ding, Mountain View, CA (US)

(73) Assignee: Volvo Car Corporation, Gothenburg (SE)

(*) Notice: Subject to any disclaimer, the term of this patent is extended or adjusted under 35 U.S.C. 154(b) by 58 days.

This patent is subject to a terminal disclaimer.

(21) Appl. No.: 16/264,727

(22) Filed: Feb. 1, 2019

(65) Prior Publication Data

US 2020/0117918 A1    Apr. 16, 2020

Related U.S. Application Data

(63) Continuation-in-part of application No. 16/158,829, filed on Oct. 12, 2018.

(51) Int. Cl.
*G06K 9/00* (2006.01)
*G06T 5/00* (2006.01)
(Continued)

(52) U.S. Cl.
CPC .......... *G06K 9/00798* (2013.01); *B60R 11/04* (2013.01); *G06T 5/006* (2013.01); *G06T 7/70* (2017.01); *G06T 2207/30256* (2013.01)

(58) Field of Classification Search
CPC ....... G06K 9/00798; G06T 7/70; G06T 5/006; B60R 11/04
See application file for complete search history.

(56) References Cited

U.S. PATENT DOCUMENTS

| 5,670,935 | A | 9/1997 | Schofield et al. |
| 9,036,943 | B1* | 5/2015 | Baldwin ............ G06K 9/00664 |
| | | | 382/284 |

(Continued)

FOREIGN PATENT DOCUMENTS

WO    0168540 A2    9/2001

OTHER PUBLICATIONS

Feb. 9, 2018 European Search Report issue on International Application No. EP17199505.

(Continued)

*Primary Examiner* — Qun Shen
(74) *Attorney, Agent, or Firm* — Clements Bernard Walker; Christopher L. Bernard

(57) ABSTRACT

A method performed by a vehicle system for handling images of the surroundings of a vehicle. An image of the surroundings of the vehicle is obtained. The image is obtained from at least one side image capturing device mounted in or on the vehicle, and the image capturing device comprises a fisheye camera lens. At least a part of the distortions in the image is corrected to obtain a corrected image. The corrected image is rotationally transformed using a first rotational transformation to obtain a first transformed image. The corrected image is rotationally transformed using a second rotational transformation to obtain a second transformed image. The first and second transformed images are consecutive or adjacent images.

20 Claims, 15 Drawing Sheets

(51) Int. Cl.
B60R 11/04 (2006.01)
G06T 7/70 (2017.01)

(56) References Cited

U.S. PATENT DOCUMENTS

| | | | | |
|---|---|---|---|---|
| 10,397,524 B1* | 8/2019 | Wu | ................ | B60R 1/00 |
| 10,650,278 B1* | 5/2020 | Ho | ................ | G06K 9/00201 |
| 2010/0045773 A1* | 2/2010 | Ritchey | ................ | H04N 5/2259 |
| | | | | 348/36 |
| 2010/0208032 A1 | 8/2010 | Kweon | | |
| 2014/0168443 A1* | 6/2014 | Aguilar | ................ | G03B 37/04 |
| | | | | 348/158 |
| 2015/0062292 A1* | 3/2015 | Kweon | ................ | H04N 5/23238 |
| | | | | 348/37 |
| 2015/0347872 A1* | 12/2015 | Taylor | ................ | G06T 7/11 |
| | | | | 382/224 |
| 2017/0026572 A1* | 1/2017 | Baran | ................ | B60R 11/04 |
| 2017/0232896 A1 | 8/2017 | Bassi et al. | | |
| 2017/0339392 A1* | 11/2017 | Forutanpour | ................ | H04N 5/23238 |
| 2018/0129887 A1* | 5/2018 | Kang | ................ | G06K 9/00798 |
| 2018/0365859 A1* | 12/2018 | Oba | ................ | B60R 1/00 |

OTHER PUBLICATIONS

May 27, 2020 European Search Report issue on International Application No. EP20154097.

Gyeong-Il Kweon et al: "Image-processing Based Panoramic Camera Employing Single Fisheye Lens". Journal of the Optical Society of Korea. vol. 14, No. 3., Sep. 25, 2010., pp. 245-259.

Gyeong-Il Kweon: "Panoramic Image Composed of Multiple Rectilinear Images Generated from a Single Fisheye Image".Journal of the Optical Society of Korea. vol. 14. No. 2., Jun. 25, 2010, pp. 109-120.

L Zelni K-Manor et al: "Squaring the circle in panoramas". Computer Vision (ICCV), 2011 IEEE International Conference On. vol. 2., 2005, p. 1292.

* cited by examiner

VEHICLE LANE MARKING AND OTHER OBJECT DETECTION USING SIDE FISHEYE CAMERAS AND THREE-FOLD DE-WARPING

CROSS-REFERENCE TO RELATED APPLICATION

The present patent application/patent is a continuation-in-part (CIP) of co-pending U.S. patent application Ser. No. 16/158,829, filed on Oct. 12, 2018, and entitled "METHOD AND SYSTEM FOR HANDLING IMAGES," the contents of which are incorporated in full by reference herein.

TECHNICAL FIELD

The present invention relates generally to the automotive field. More specifically, the present invention relates to systems and methods for vehicle lane marking and other object detection using side fisheye cameras and three-fold de-warping.

BACKGROUND ART

There are a variety of known methodologies for performing object display and detection using the front, rear, and side cameras of a vehicle and standard camera images. These methodologies allow such objects to be displayed to a vehicle occupant on an in-vehicle display screen, and an artificial intelligence (AI) algorithm can be applied to the standard camera images to allow a driver assist (DA) or autonomous driving (AD) system to recognize, segment, annotate, process, respond, and/or react to the objects. Often, multiple front, rear, and side camera images are combined into a single camera image on the in-vehicle display screen, providing the vehicle occupant with a surrounding view that is essentially unobstructed by the vehicle itself. One challenge faced is that the front and rear cameras, as well as side cameras, are often fisheye cameras.

A standard camera lens, also referred to as a rectilinear camera lens, is a camera lens that reproduces straight lines as straight lines. A fisheye camera lens, also referred to as a curvilinear camera lens or an omnidirectional camera lens, on the other hand, reproduces straight lines as curved lines, i.e., it provides a convex non-rectilinear appearance.

The front portion of a fisheye camera lens utilizes a cupola or domed shaped front end, and the fisheye camera lens derives its name from being similar in appearance to the eye of a fish. A fisheye camera lens is an example of a panoramic or hemispherical camera lens that has a field of view that is e.g. 180°, 220°, or 360°. A fisheye camera lens thus has a wider field of view than a rectilinear camera lens, and has the ability to capture large dimensions of a specified area in one shot. Instead of producing images with straight lines of perspective (i.e., rectilinear images), the fisheye camera lens produces images with convex non-rectilinear lines of perspective. Thus, a fisheye camera lens provides images with altered or inaccurate views, i.e., with visual distortion. There are several types of fisheye camera lenses, such as a circular fisheye camera lens, a full-frame fisheye camera lens, a panomorph fisheye camera lens, an omnidirectional camera lens, etc.

Thus, fisheye camera lenses are widely used as visual sensors in DA and AD systems because of their good coverage (i.e., wide field of view). However, this comes with costs: the unnatural images caused by distortion, especially at the outer edges of the images. This not only makes it difficult for a vehicle occupant to understand and interpret the content of such images, but also causes problems for AI algorithms that process the images. Most computer vision and machine learning (ML) algorithms are designed for and trained on non-fisheye (i.e., standard, undistorted) datasets, which makes them sub-optimal or even prone to failure when performing on the highly distorted images captured by fisheye camera lenses.

Some existing approaches undistort images at the cost of losing a large portion of the cameras' field of view, which defeats the purpose of using the fisheye camera lens to begin with. A vehicle detection system is an exemplary system that uses fisheye camera lenses for detecting surrounding vehicles. FIGS. 1a and 1b illustrate the operation of such a vehicle detection system, where FIG. 1a illustrates the vehicle detection system applying a distorted image and FIG. 1b illustrates the vehicle detection system applying an undistorted image. In more detail, FIGS. 1a and 1b illustrate the enhancement of detection performance for a single-shot detection (SSD) object detection algorithm for AD using a conventional fisheye camera lens methodology to minimize distortion, which comes at the cost of losing a large portion of the field of view. FIG. 1a illustrates the curvilinear image captured by a fisheye camera lens located at the side (i.e., flank) of a vehicle. The bounding boxes around two of the vehicles represent that they are the vehicles that are detected. The vehicles that do not have any bounding boxes around them are not detected by the vehicle detection system due to the distortions in the image. FIG. 1b illustrates the undistorted image, where a large portion of the field of view is lost, but where all the vehicles in the remaining field of view are detected by the vehicle detection system, as indicated by the bounding boxes around the vehicles. FIGS. 1a and 1b serve the purpose of highlighting two facts: (1) mitigating distortion improves the performance of software such as the vehicle detection system and (2) mitigating distortion undesirably reduces the field of view.

One important object detection function is lane marking detection. Such lane marking detection is typically carried out using a standard front or rear camera image, or a side fisheye camera image that is undistorted using a conventional methodology, thereby sacrificing field of view and detection scope. A significant problem arises, however, under low-standing sun or glare conditions, when a standard front camera image can be obscured, for example. The present invention provides systems and methods that address this and other problems.

SUMMARY

The present invention provides systems and methods for vehicle lane marking and other object detection using side fisheye cameras and three-fold de-warping. Three-fold de-warping is applied to a side fisheye camera image to create straight, rectilinear side, front, and rear camera images that are readily displayed and understood by a vehicle occupant and/or processed as a suitable dataset for an AI algorithm in a DA or AD system. This three-fold de-warping of the side fisheye camera image preserves field of view, such that all surrounding lane markings and other objects can be viewed and/or detected. Advantageously, the side fisheye camera image is typically not obscured by low-standing sun or glare conditions (at least not on both sides of a vehicle), and can be used when the vehicle is traveling towards or away from the sun or glare source, as a replacement for or complement to the images obtained from typical front or rear camera methodologies. The three-fold de-warped, straight, rectilinear side, front, and rear camera images obtained from the side fisheye camera image are ideally suited for use as a dataset for any variety of AI algorithms, again as a replacement for or complement to the typical front or rear camera methodologies. Thus, the systems and methods for vehicle lane marking and other object detection using side fisheye cameras and three-fold de-warping provided herein can be used as a replacement or substitute for conventional front or rear camera methodologies depending upon vehicle operating and camera visibility conditions, or can be used as a verification of or complement to such conventional front or rear camera methodologies.

In general, the claimed systems and methods first obtain an image of the surroundings of the vehicle. The image is obtained from at least one image capturing device mounted in or on the vehicle, such as a side camera of the vehicle. The image capturing device includes a fisheye lens. The systems/methods correct at least a part of the distortions in the image to obtain a corrected image. The systems/methods rotationally transform the corrected image using a first rotational transformation to obtain a first transformed image and rotationally transform the corrected image using a second rotational transformation to obtain a second transformed image. The first and second transformed images are preferably consecutive images.

In one exemplary embodiment, provided herein is a method of handling images of surroundings of a vehicle, the method including: obtaining an image of the surroundings of the vehicle, wherein the image is obtained from at least one side image capturing device mounted in or on the vehicle, and wherein the at least one side image capturing device includes a fisheye camera lens; correcting at least a part of distortions in the image to obtain a corrected image; rotationally transforming the corrected image using a first rotational transformation to obtain a first transformed image; and rotationally transforming the corrected image using a second rotational transformation to obtain a second transformed image, wherein the first and second transformed images are consecutive or adjacent images. Optionally, the step of obtaining the image of the surroundings of the vehicle using the at least one side image capturing device is performed only after determining that one of a front or a rear image capturing device is obscured. Alternatively, the step of obtaining the image of the surroundings of the vehicle using the at least one side image capturing device is performed simultaneously with a step of obtaining another image of the surroundings of the vehicle using at least one of a front or a rear image capturing device. Preferably, the surroundings of the vehicle include one or more lane markings. The first and second transformed images are provided to an artificial intelligence algorithm operable for performing lane marking detection using the first and second transformed images. The method further includes removing redundant overlapping areas from at least one of the first and second transformed images. The first transformed image is mapped on one planar surface and the second transformed image is mapped on another planar surface. The method further includes displaying at least one of the first and second transformed images to a user of the vehicle.

In another exemplary embodiment, provided herein is a computer program including instructions which, when executed on at least one processor, cause the at least one processor to carry out the method including the following steps: obtaining an image of the surroundings of the vehicle, wherein the image is obtained from at least one side image capturing device mounted in or on the vehicle, and wherein the at least one side image capturing device includes a fisheye camera lens; correcting at least a part of distortions in the image to obtain a corrected image; rotationally transforming the corrected image using a first rotational transformation to obtain a first transformed image; and rotationally transforming the corrected image using a second rotational transformation to obtain a second transformed image, wherein the first and second transformed images are consecutive or adjacent images. Optionally, the step of obtaining the image of the surroundings of the vehicle using the at least one side image capturing device is performed only after determining that one of a front or a rear image capturing device is obscured. Alternatively, the step of obtaining the image of the surroundings of the vehicle using the at least one side image capturing device is performed simultaneously with a step of obtaining another image of the surroundings of the vehicle using at least one of a front or a rear image capturing device. Preferably, the surroundings of the vehicle include one or more lane markings. The first and second transformed images are provided to an artificial intelligence algorithm operable for performing lane marking detection using the first and second transformed images. The method further includes the step of removing redundant overlapping areas from at least one of the first and second transformed images. The first transformed image is mapped on one planar surface and the second transformed image is mapped on another planar surface. The method further includes the step of displaying at least one of the first and second transformed images to a user of the vehicle.

In a further exemplary embodiment, provided herein is a system for handling images of surroundings of a vehicle, the system including: at least one side image capturing device mounted in or on the vehicle operable for obtaining an image of the surroundings of the vehicle, wherein the at least one side image capturing device includes a fisheye camera lens; a correcting module executed on a processor operable for correcting at least a part of distortions in the image to obtain a corrected image; a transforming module executed on the processor operable for rotationally transforming the corrected image using a first rotational transformation to obtain a first transformed image; and the transforming module executed on the processor operable for rotationally transforming the corrected image using a second rotational transformation to obtain a second transformed image, wherein the first and second transformed images are consecutive or adjacent images. Optionally, obtaining the image of the surroundings of the vehicle using the at least one side image capturing device is performed only after determining that one of a front or a rear image capturing device is obscured. Alternatively, obtaining the image of the surroundings of the vehicle using the at least one side image capturing device is performed simultaneously with obtaining another image of the surroundings of the vehicle using at least one of a front or a rear image capturing device. Preferably, the surroundings of the vehicle include one or more lane markings, wherein the first and second transformed images are provided to an artificial intelligence algorithm operable for performing lane marking detection using the first and second transformed images.

BRIEF DESCRIPTION OF THE DRAWINGS

The present invention is illustrated and described herein with reference to the various drawings, in which like reference numbers are used to denote like system components/method steps, as appropriate, and in which.

The drawings provided herein are not necessarily to scale and the dimensions of certain features may be exaggerated for the sake of clarity. Emphasis is instead placed on illustrating the principles of operation of the exemplary embodiments provided herein.

DESCRIPTION OF EMBODIMENTS

The present invention provides systems and methods for vehicle lane marking and other object detection using side fisheye cameras and three-fold de-warping. Three-fold de-warping is applied to a side fisheye camera image to create straight, rectilinear side, front, and rear camera images that are readily displayed and understood by a vehicle occupant and/or processed as a suitable dataset for an AI algorithm in a DA or AD system. This three-fold de-warping of the side fisheye camera image preserves field of view, such that all surrounding lane markings and other objects can be viewed and/or detected. Advantageously, the side fisheye camera image is typically not obscured by low-standing sun or glare conditions (at least not on both sides of a vehicle), and can be used when the vehicle is traveling towards or away from the sun or glare source, as a replacement for or complement to the images obtained from typical front or rear camera methodologies. The three-fold de-warped, straight, rectilinear side, front, and rear camera images obtained from the side fisheye camera image are ideally suited for use as a dataset for any variety of AI algorithms, again as a replacement for or complement to the typical front or rear camera methodologies. Thus, the systems and methods for vehicle lane marking and other object detection using side fisheye cameras and three-fold de-warping provided herein can be used as a replacement or substitute for conventional front or rear camera methodologies depending upon vehicle operating and camera visibility conditions, or can be used as a verification of or complement to such conventional front or rear camera methodologies.

Thus, the systems/methods provided herein provide a means for de-warping and undistorting images (e.g., 180-degree images and 360-degree images) that enhance the visualizing of lane markings and other objects for a vehicle occupant (e.g., a vehicle driver), as well as the performance of conventional computer vision and ML algorithms.

Figure 1A:
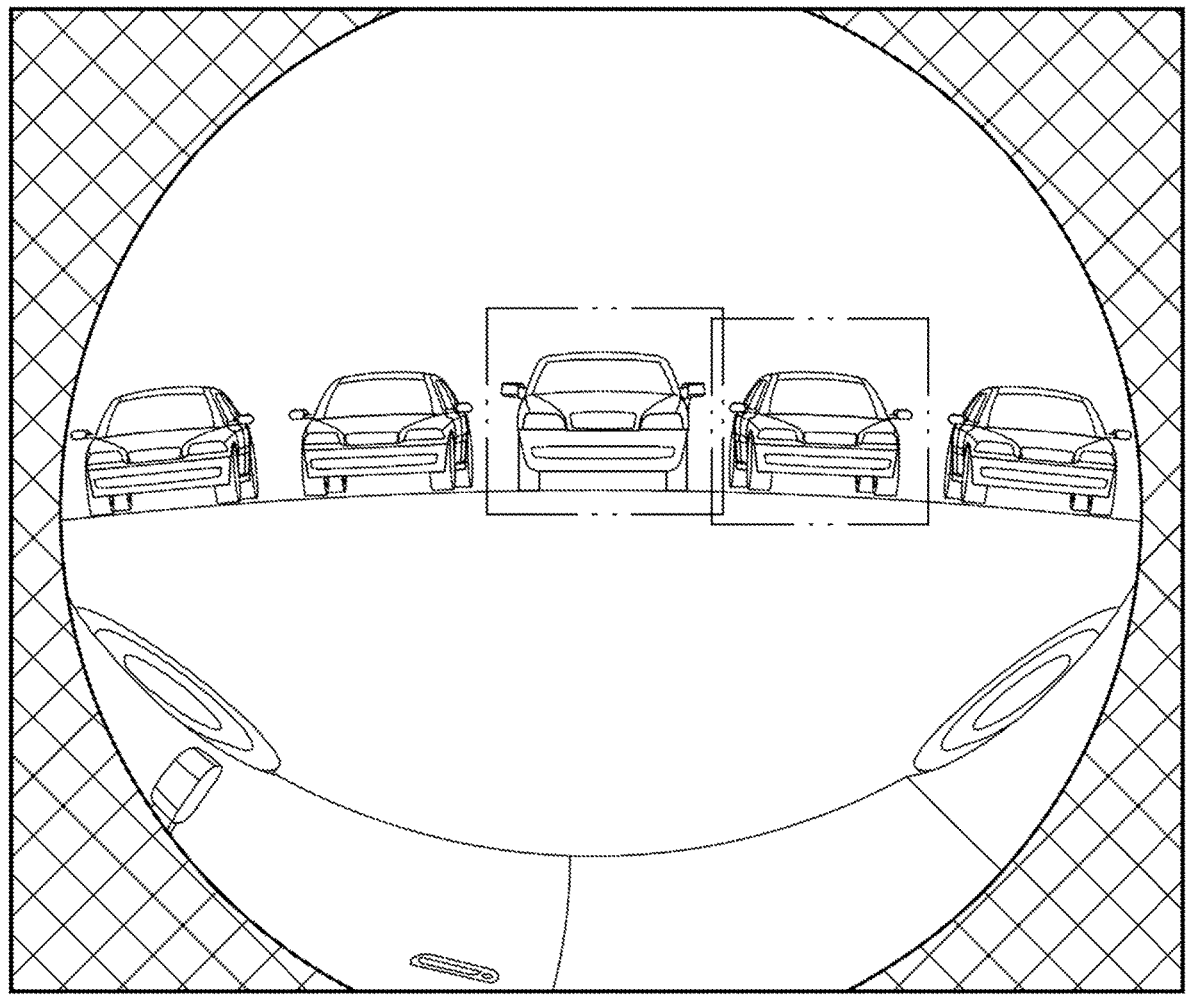
FIG. 1a is a schematic diagram illustrating the operation of a conventional vehicle detection system using a distorted image.
Figure 1B:
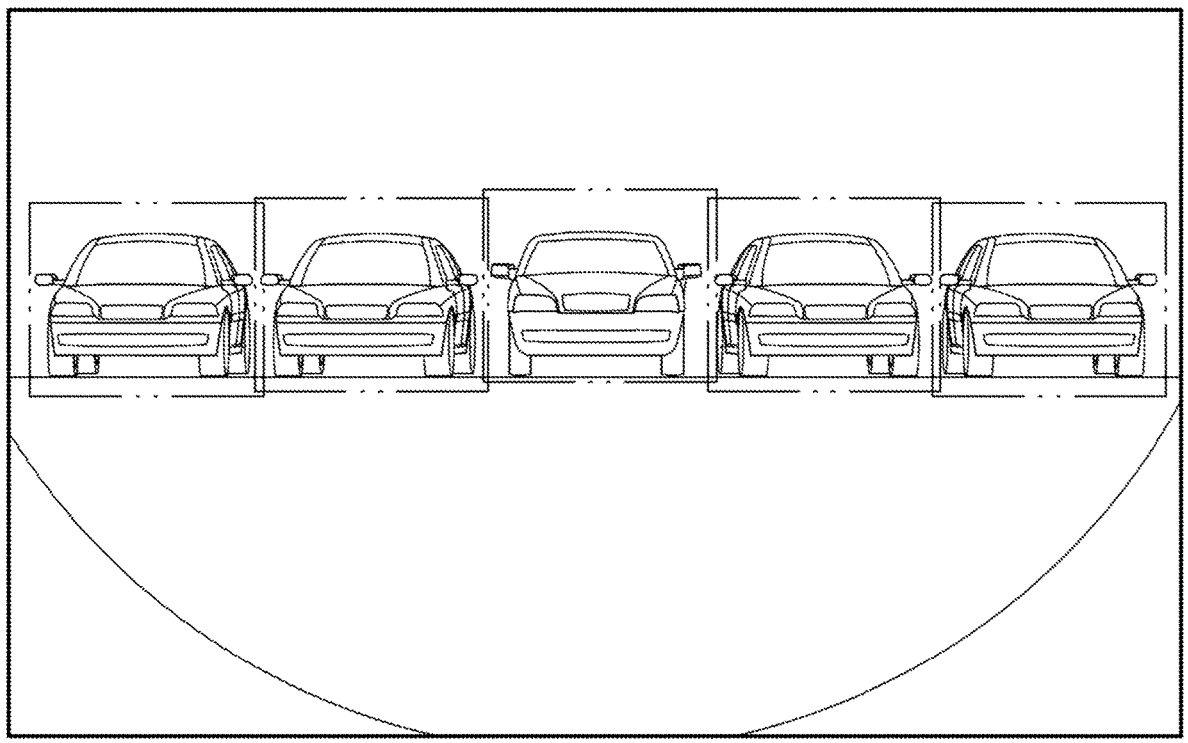
FIG. 1b is a schematic diagram illustrating the operation of a conventional vehicle detection system using an undistorted image.
Figure 2:
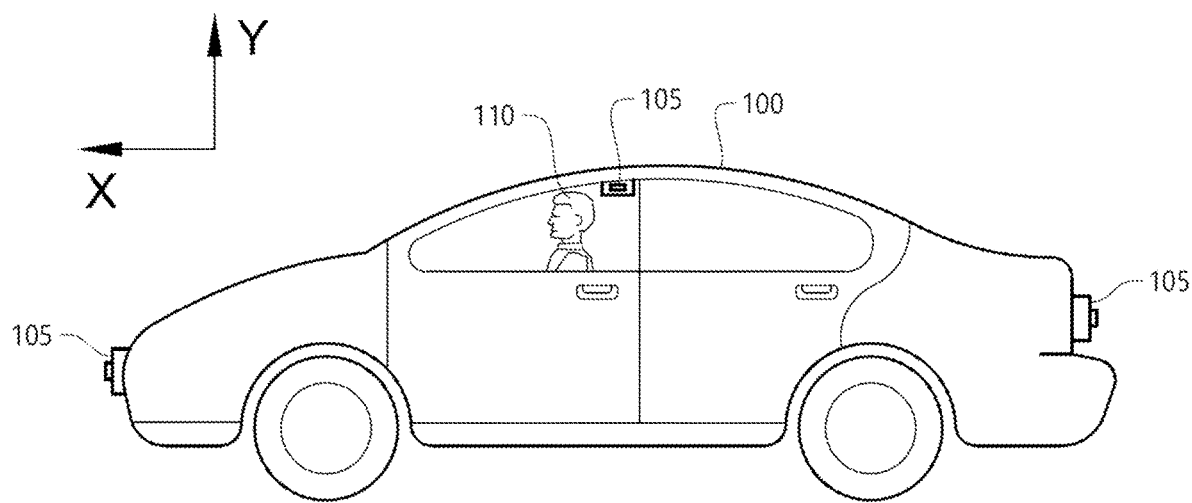
FIG. 2 is a schematic diagram illustrating a vehicle incorporating front, rear, and side cameras utilized in accordance with the systems and methods provided herein.

FIG. 2 is a schematic diagram illustrating a vehicle 100. The vehicle 100 can be any vehicle, for instance, a car, truck, van, bus, motorcycle, passenger transport, etc. The vehicle 100 can be at least partly autonomous or self-driven, it can be completely autonomous or self-driven, or it can be non-autonomous or self-driven.

The vehicle 100 utilizes at least one image capturing device 105. FIG. 2 illustrates an example where the vehicle 100 utilizes three or four image capturing devices 105, but any other suitable number of image capturing devices 105 is applicable. In FIG. 2, the image capturing devices 105 are located at the front of the vehicle 100, at one or both sides of the vehicle 100, and at the rear of the vehicle 100. Thus, the image capturing devices 105 can be referred to as being forward looking, sideways looking, and backwards looking. At least the side image capturing devices 105 include a fisheye camera lens and can also be referred to as a fisheye camera or an ultra-wide angle camera. Such side image capturing devices 105 can be adapted to capture an image of at least 180 degrees of the surroundings of the vehicle 100, for example. In some embodiments, the image capturing device 105 may be adapted to capture an image of 360 degrees of the surroundings of the vehicle 100, for example.

A fisheye camera lens can produce strong visual distortion in obtained images, including wide panoramic or hemispherical images. Fisheye camera lenses are designed to achieve extremely wide angles of view, but instead of images with straight lines of perspective (i.e., rectilinear images) as obtained by rectilinear camera lenses, fisheye camera lenses use mapping, which gives images a characteristic convex non-rectilinear appearance.

The method performed by the vehicle system for handling images of the surroundings of the vehicle 100, including lane markings and other objects, is described with reference to the flowchart depicted in FIG. 3. The method performed by the vehicle system includes at least one of the following steps, which steps can be carried out in any suitable order.

Step 301: The vehicle system obtains an initial image 400 of the surroundings of the vehicle 100. The image 400 is obtained from at least one image capturing device 105 mounted in or on the vehicle 100. The image capturing device 105 includes a fisheye camera lens, and therefore the obtained image can be referred to as a fisheye camera image. The image 400 can be obtained by receiving it directly from the image capturing device 105. In another embodiment, the image capturing device 105 captures the image 400 and stores it in a memory, and then the vehicle system obtains the image 400 from the memory. The image may be obtained upon request from the vehicle system, on a periodic basis, or continuously. As described herein above, the initially obtained image 400 includes distortions. The image 400 can be of at least 180 degrees of the surroundings of the vehicle 100, for example. The image capturing device 105 can be a fisheye camera accordingly.

Step 302: The vehicle system then corrects at least a part of the distortions in the image 400 to obtain a corrected image. This correcting process can also be referred to as de-warping or base de-warping. A base de-warp can be carried out by any appropriate camera calibration algorithms or models executed by the vehicle system that obtains a mapping from warped coordinates to de-warped coordinates, as well as the intrinsic parameters of the image capturing device 105. De-warping can be described as correcting the obtained image 400 to reverse the effects of geometric distortions caused by the image capturing device 105, e.g., the fisheye camera lens of the mage capturing device 105.

Step 303: The vehicle system rotationally transforms the corrected image using a first rotational transformation to obtain a first transformed image 403.

Step 304: The vehicle system rotationally transforms the corrected image using a second rotational transformation to obtain a second transformed image 405. The first and second rotational transformations are different from each other, in that the first and second transformed images 403, 405 are preferably consecutive images. The term "consecutive images" can refer to images that are following, sequential, serial, succeeding, adjacent, etc. For example, the first transformed image 403 and the second transformed image 405 are consecutive in that the first transformed image 403 represents the right part of the obtained image and the second transformed image 405 represents the left part of the obtained image. When the two transformed images 403, 405 are placed together, they form one image which corresponds to the obtained image, but instead it provides an undistorted image relative to the initial image 400.

Figure 4A:
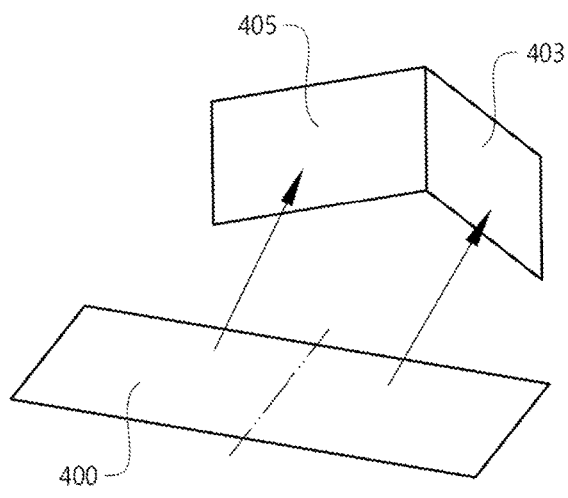
FIGS. 4a and 4b are schematic diagrams illustrating two-fold forms/patterns.
Figure 4B:
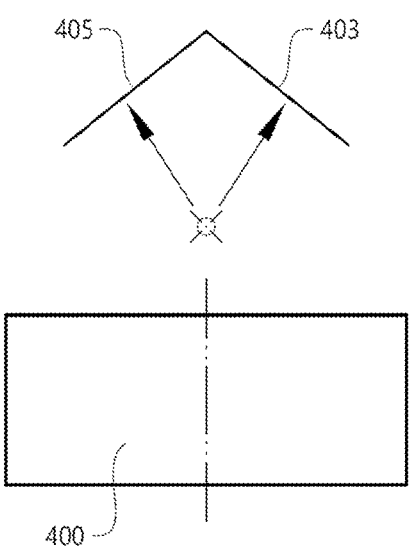

The first transformed image 403 can be mapped on one planar surface and the second transformed image 405 can be mapped on another planar surface, as illustrated in FIGS. 4a and 4b. The two planar surfaces can be located next to each other, i.e., they are consecutive or adjacent surfaces. FIG. 4a illustrates a three-dimensional (3D) view of the two-fold form/pattern. FIG. 4b also illustrates a 3D view of the two-fold form/pattern in another view.

Steps 303 and 304 can be referred to as a two-fold mapping, where two rotational transformations are applied separately after the base de-warp. This generates two different views. The amount of rotation applied in each rotational transformation is set or can be adjusted such that the de-warped images look natural and as if they are captured by two cameras facing different directions or having different orientations. The structure of the two-fold is demonstrated in FIGS. 4a and 4b.

Step 305: The vehicle system can remove redundant overlapping areas from at least one of the first and second transformed images 403, 405. This step includes applying appropriate cropping to remove part of the redundant overlapping areas between the first and second transformed images 403, 405. This step can also remove a part of any highly distorted areas (usually at the edges of the views). Some overlapping areas may be preserved between the first and second transformed images 403, 405 to allow for potential stitching/porting of algorithm results between the first and second transformed images 403, 405.

The first and second transformed images 403, 405 (possibly also after removal of the redundant overlapping areas) can be referred to as the resulting undistorted, de-warped images. The resulting undistorted, de-warped images allow for more natural and understandable views in at least two directions defined by the planar surfaces.

Step 306: The vehicle system can provide the first and second transformed images 403, 405 as input to another vehicle system for further processing. Such other vehicle system may be, for example, a lane detection system, a vehicle detection system, a crash avoidance system, an AD system, etc. The first and second transformed images 403, 405 allow for "general" ML/computer vision algorithms/models to be applied by the vehicle system or by other vehicle systems. Here, "general" algorithms/models may refer to those designed for and/or trained on images that are usually captured by standard cameras, i.e., non-fisheye/non-omnidirectional cameras.

Step 307: The vehicle system can display at least one of the first and second transformed images 403, 405 to a vehicle occupant. In one embodiment, all transformed images 403, 405 can be displayed on a display screen in the vehicle 100 at the same time. In another embodiment, one image 403, 405 can be displayed at a time, and the vehicle occupant can then switch between the different images.

Figure 3:
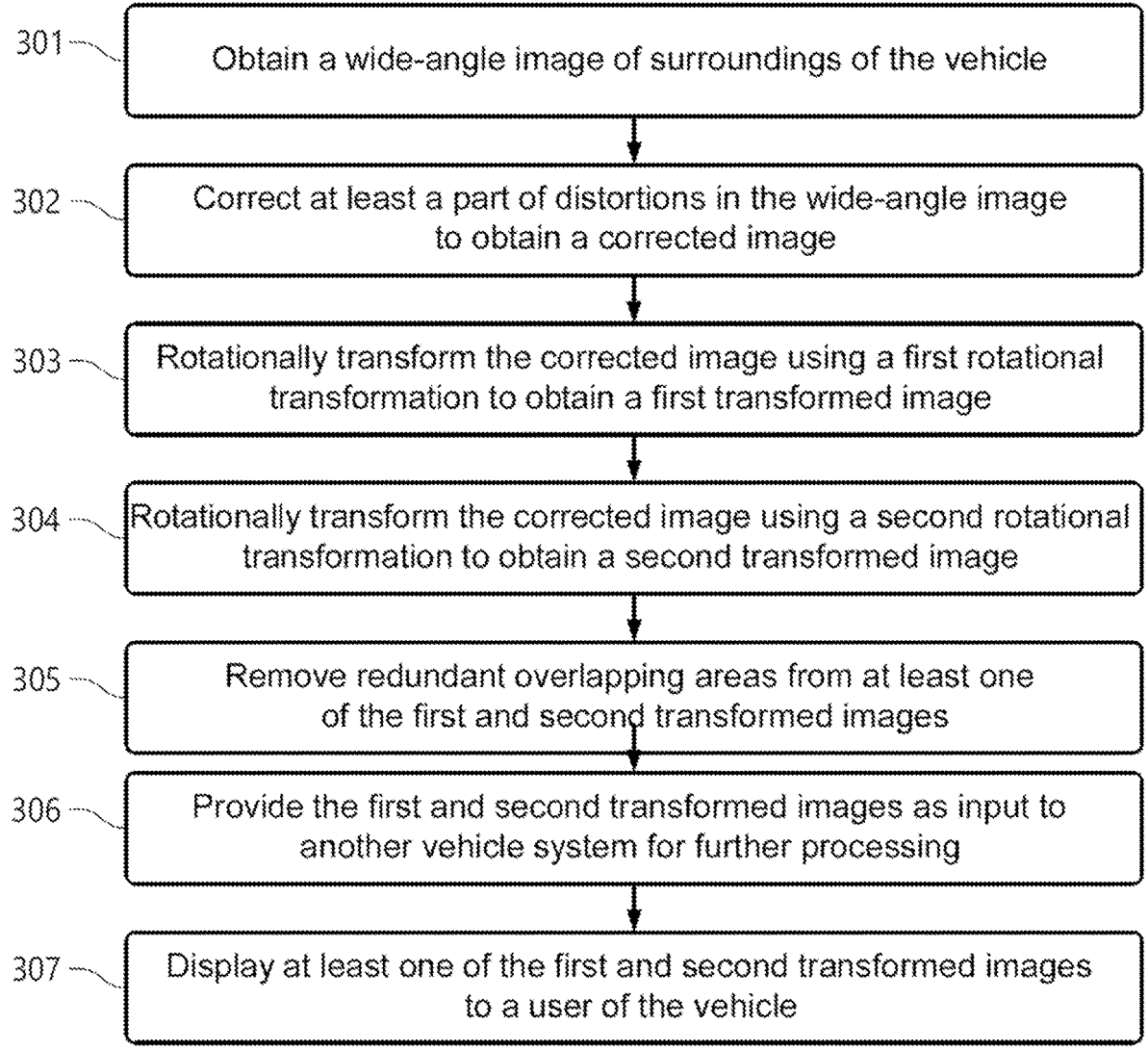
FIG. 3 is a flow chart illustrating one exemplary embodiment of the method provided herein.
Figure 5:
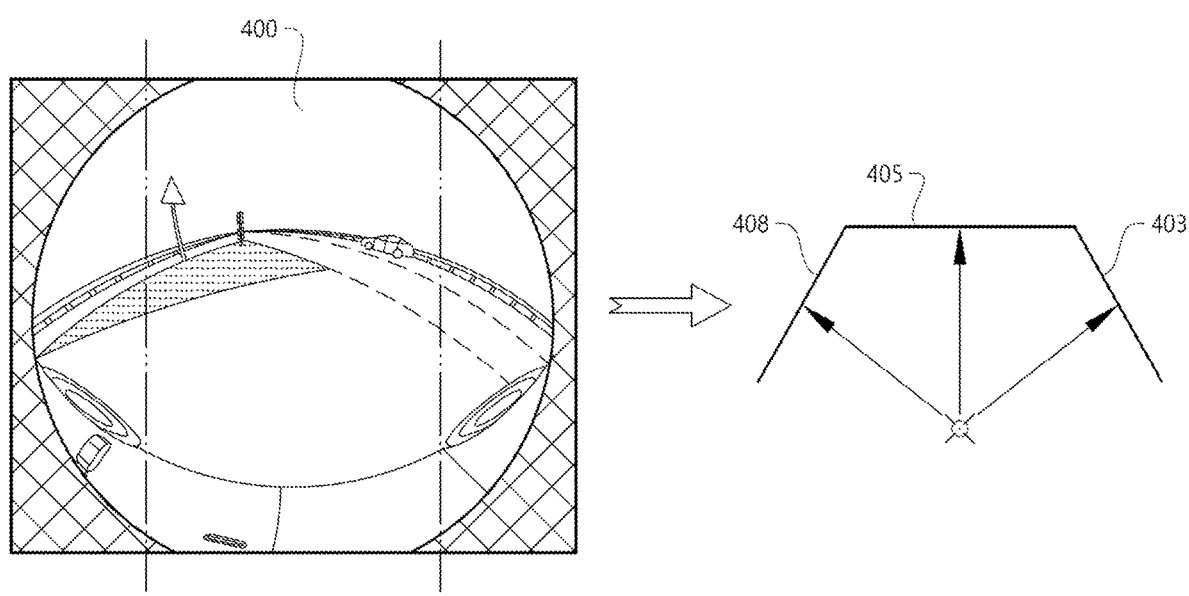
FIG. 5 is a schematic diagram illustrating a three-fold form/pattern.

The method of FIG. 3 is described with at least two rotational transformations. FIG. 5 provides an example with three rotational transformations. In other words, FIG. 5 illustrates how a two-dimensional (2D) image captured by a 360-degree fisheye camera 105 is mapped onto three planar surfaces. The three rotational transformations provide a first transformed image 403, a second transformed image 405, and a third transformed image 408. The vehicle system rotationally transforms the corrected image using a third rotational transformation to obtain the third transformed image 408. The first, second, and third rotational transformations are different from each other, in that the first, second, and third transformed images 403, 405, 408 are consecutive or adjacent images. The left part of FIG. 5 illustrates the obtained image 400, i.e., the original view, with the dashed lines indicating the splitting of such image 400 into three folds. The right part of FIG. 5 illustrates the three transformed images 403, 405, 408, i.e., the top view of the formation of the three planar surfaces.

Figure 6:
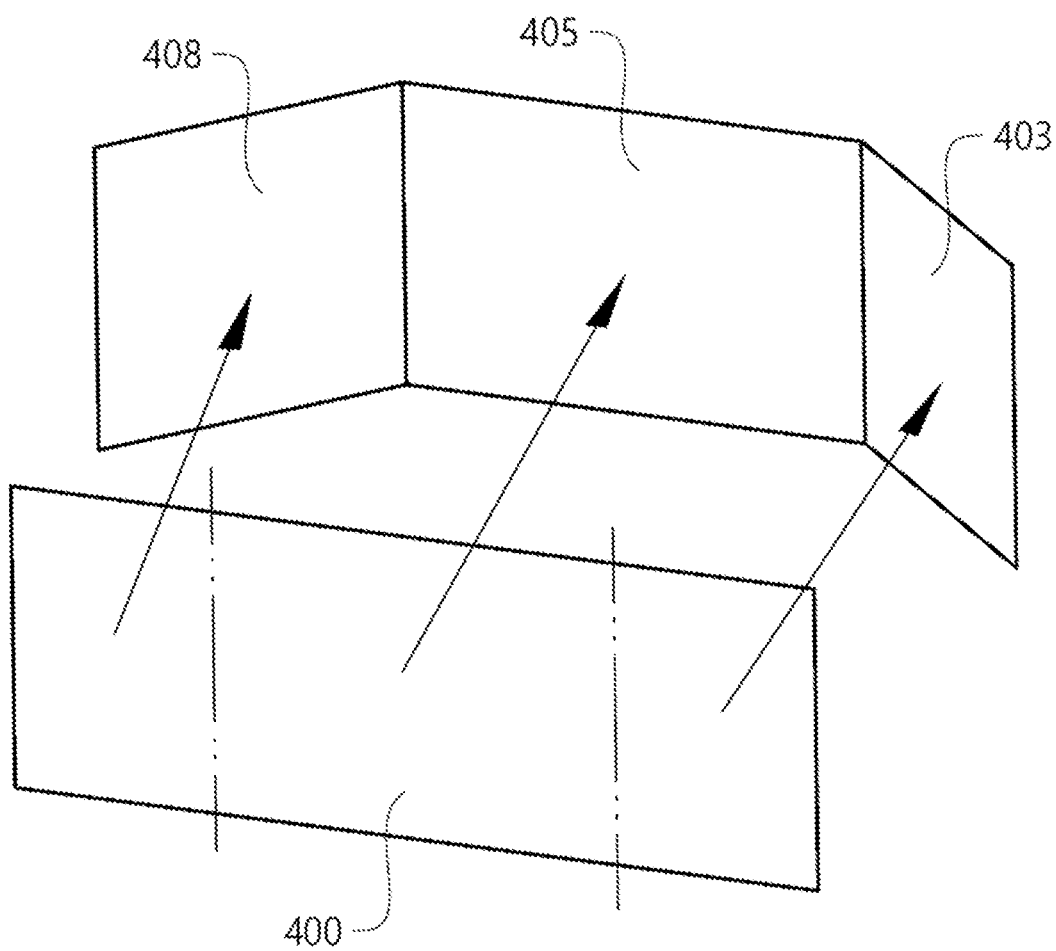
FIG. 6 is a schematic diagram illustrating another three-fold form/pattern.

FIG. 6 presents the three-fold pattern in 3D from a different perspective as compared to FIG. 5.

Figure 7A:
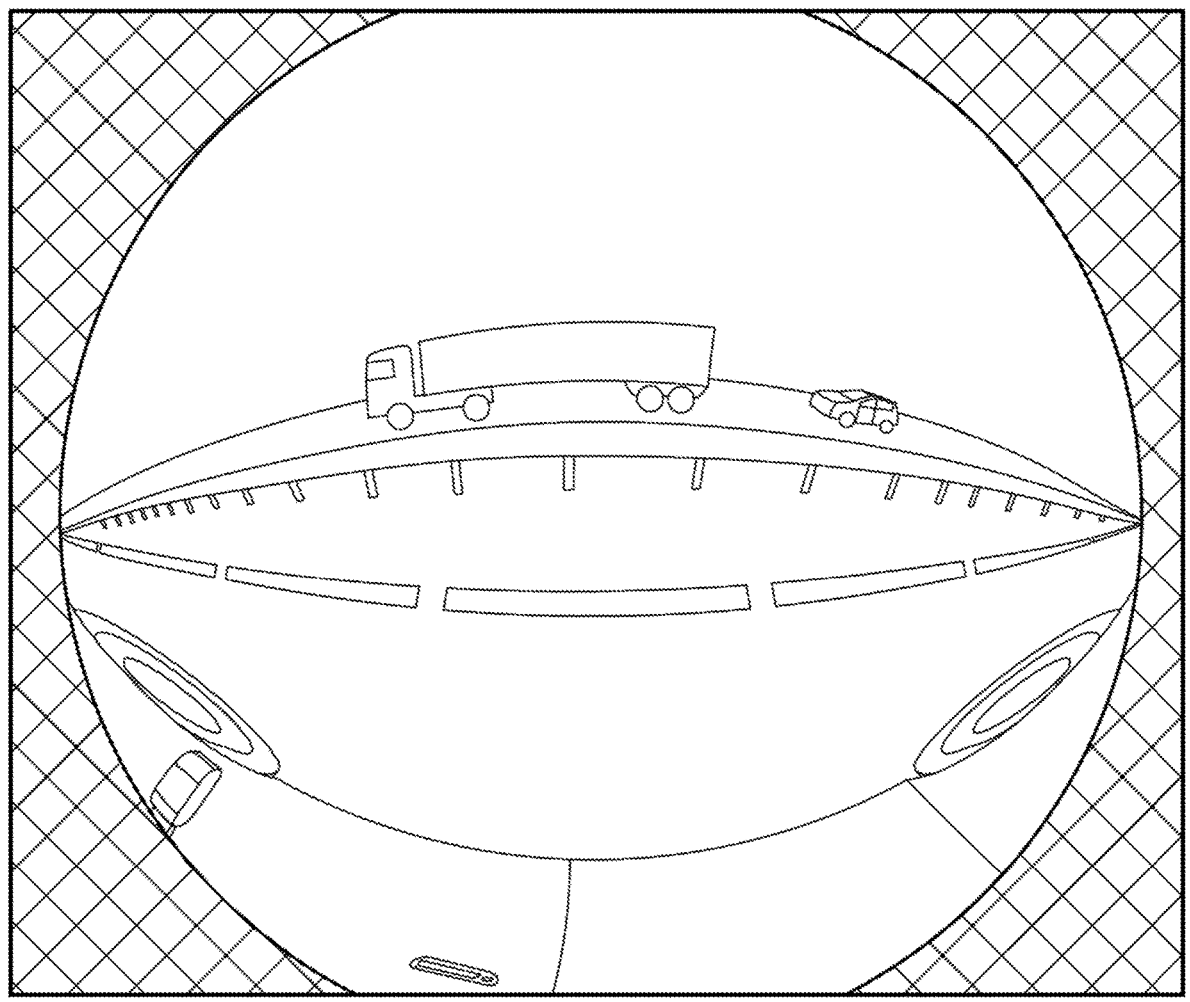
FIGS. 7a and 7b are schematic diagrams illustrating the three-fold de-warping of a side fisheye camera image using the systems and methods provided herein.
Figure 7B:
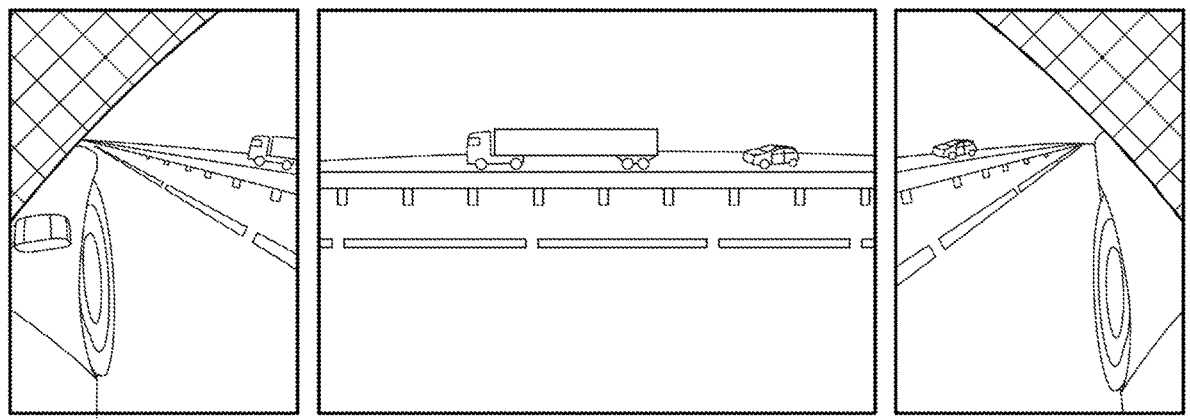
Figure 8A:
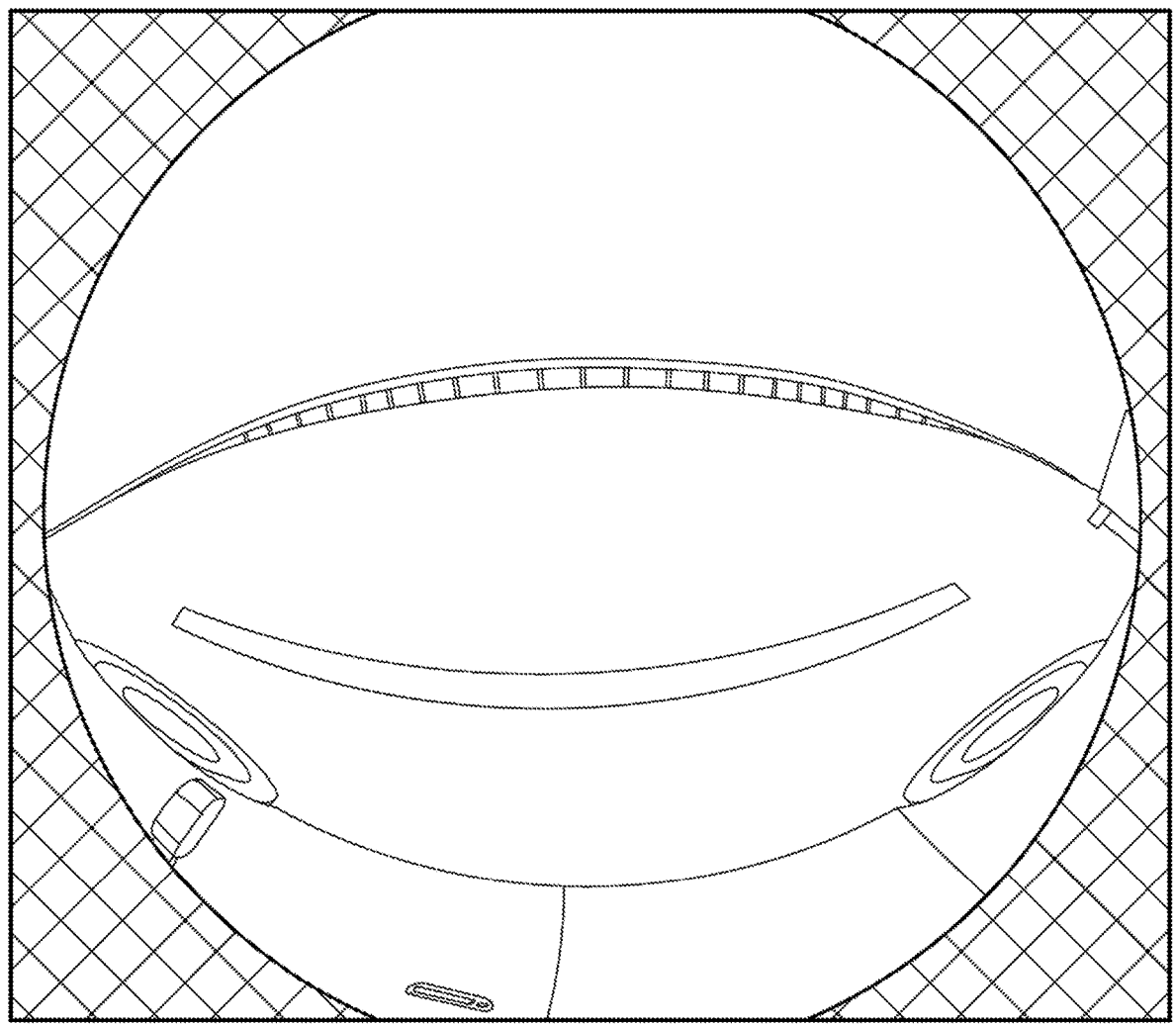
FIGS. 8a and 8b are schematic diagrams illustrating another three-fold de-warping of a side fisheye camera image using the systems and methods provided herein.
Figure 8B:
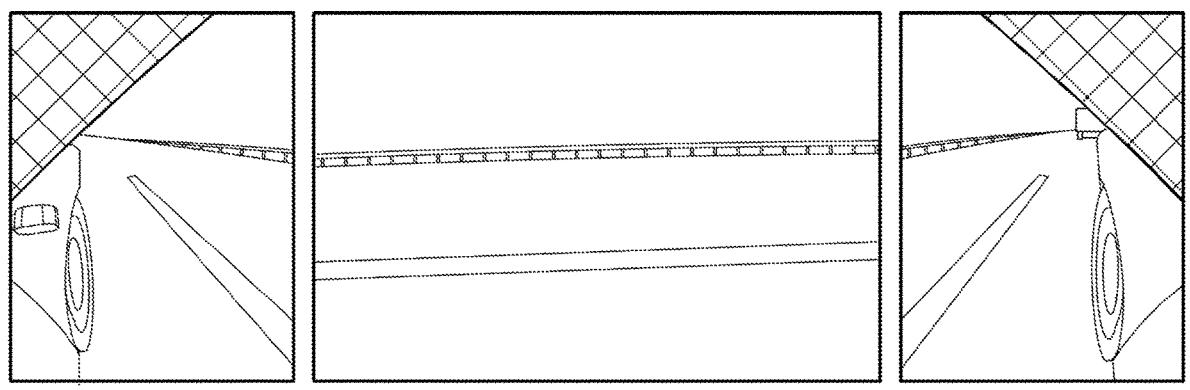

FIGS. 7a, 7b, 8a and 8b illustrate examples of resulting images. The figures illustrate images taken from a left-facing image capturing device 105 mounted in or on a vehicle 100 going on an expedition on a highway, for example. The image capturing device 105 is exemplified with a 360-degree fisheye camera. FIGS. 7a and 7b illustrate the result of applying the three-fold de-warping. FIG. 7a is the original input image captured by the 360-degree fisheye camera 105. FIG. 7b illustrates the three resulting images that are mapped onto three planar surfaces. FIGS. 8a and 8b illustrate another such result. FIG. 8a is the original input image captured by the 360-degree fisheye camera 105. FIG. 8b illustrates the three resulting images that are mapped onto three planar surfaces.

The original images before three-fold de-warping (i.e., before steps 302-307) are shown in FIGS. 7a and 8a. FIGS. 7b and 8b show the images after de-warping (i.e., after step 304, and possibly also after step 305). In FIGS. 7b and 8b, the left and right images synthesize the views of the forward and backward facing cameras, which gives a vehicle occupant a better sense of position and direction, as compared to the previously distorted area at the edges. It can be clearly seen that the images in FIGS. 7b and 8b are much more intuitive after the de-warping.

In both FIGS. 7a and 8a, the lane markings are highly distorted, whereas they are undistorted in FIGS. 7b and 8b. The curved lane markings are corrected to be straight, and this is desired and will improve the performance of other vehicle systems, such as e.g. an AD system (in this case, a lane detection system) that utilizes these images. Also, it should be noticed that in the right image of FIG. 8a, the previously sideways rotated truck is now upright positioned, which in this case helps a vehicle detection system.

The embodiments provided herein aim at achieving undistorted images without losing much field of view of the image capturing device 105, so that the images can be better used by both vehicle occupants (e.g., users 110) and vehicle systems (e.g., AI/ML/computer vision algorithms for DA and AD).

Steps 302, 303, and 304 will now be described in more detail using three rotational transformations as an example.

Step 302: The base de-warp can be described as the process of estimating a set of intrinsic related parameters K, ξ and D, as well as a set of extrinsic related parameters r and t, from a set of images containing a calibration pattern, such as a chessboard. Here, K is a generalized image capturing device matrix, ξ is a single value parameter, D includes the distortion coefficients, and r and t characterize rotations and translations between the set of images and the image capturing device 105, respectively. K, ξ and D are used to undistort the images taken by the image capturing device 105. The image capturing device matrix for the rectified images $K_{new}$ is usually a scaled identity matrix.

Steps 303 and 304: A rotational transformation is applied after the base de-warp in step 302 by multiplying a rotational matrix R with the image capturing device matrix for rectified images $K_{new}$:

$$K_R = K_{new} \cdot R$$

The new image capturing device matrix $K_R$ replaces $K_{new}$, and is used together with the previous K, ξ and D to obtain the rotated views of the undistorted images (i.e., the first, second, and third transformed images 403, 405, 408).

Here, the rotational transformation can be decomposed into three rotational transformations around x (horizontal), y (vertical), and z (optical axis of the fisheye camera lens in the image capturing device 105) axes.

$$R = R_z R_y R_x$$

$$R_x = \begin{bmatrix} 1 & 0 & 0 \\ 0 & \cos\theta_x & -\sin\theta_x \\ 0 & \sin\theta_x & \cos\theta_x \end{bmatrix}$$

$$R_y = \begin{bmatrix} \cos\theta_y & 0 & \sin\theta_y \\ 0 & 1 & 0 \\ -\sin\theta_y & 0 & \cos\theta_y \end{bmatrix}$$

$$R_z = \begin{bmatrix} \cos\theta_z & -\sin\theta_z & 0 \\ \sin\theta_z & \cos\theta_z & 0 \\ 0 & 0 & 1 \end{bmatrix}$$

For the left fold among the three-fold de-warps (the angles are in radians):

$\theta_x = 0$ $\theta_y \in [0.65, 0.95]$ $\theta_z \in [0.4, 0.7]$

For the center fold among the three-fold de-warps (the angles are in radians):

$\theta_x \in [0, 0.3]$ $\theta_y = 0$ $\theta_z = 0$

For the right fold among the three-fold de-warps (the angles are in radians):

$\theta_x = 0$ $\theta_y \in [-0.95, -0.65]$ $\theta_z \in [-0.7, -0.4]$

Figure 9:
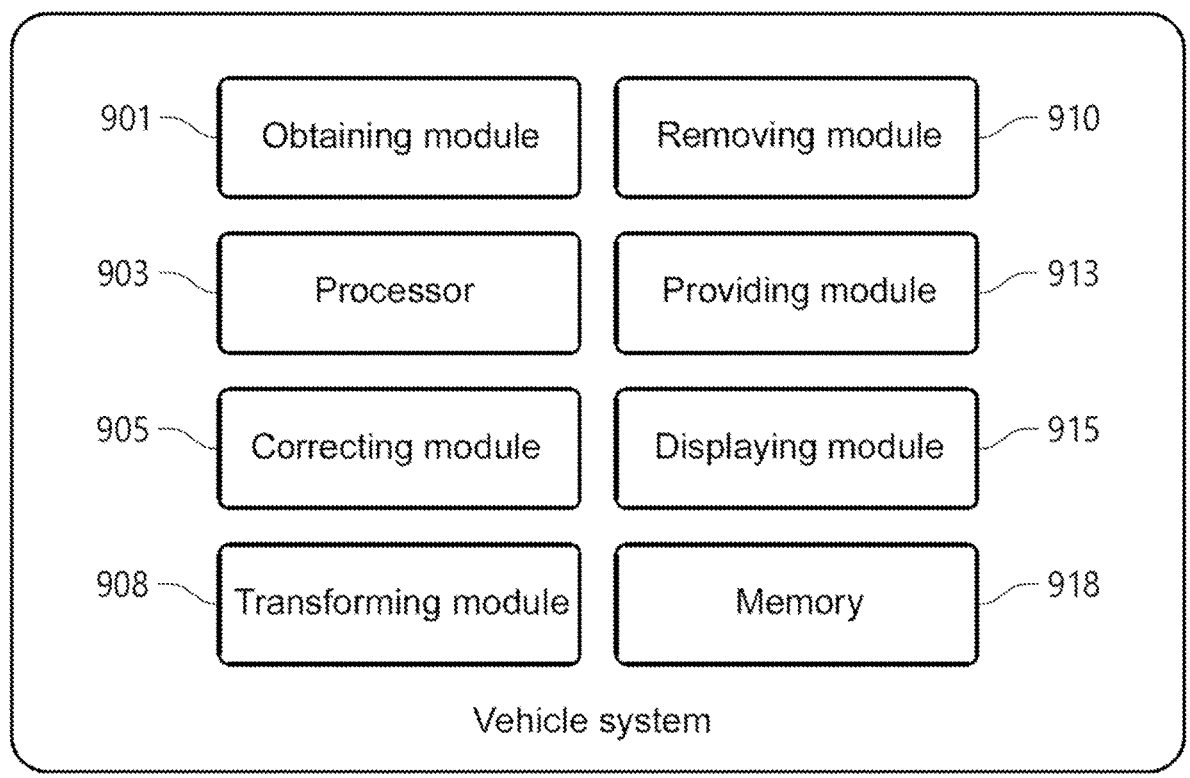
FIG. 9 is a schematic diagram illustrating one exemplary embodiment of the system provided herein.

To perform the method steps shown in FIG. 3 for handling images of the surroundings of a vehicle 100, the vehicle system can utilize an arrangement as shown in FIG. 9.

The vehicle system is adapted to, e.g., by means of an obtaining module 901, obtain an image of the surroundings of the vehicle 100. The image is obtained from at least one image capturing device 105 mounted on/to the vehicle 100. The image capturing device 105 includes a fisheye camera lens. The image can be of at least 180 degrees of the surroundings of the vehicle 100. The image capturing device 105 can be a fisheye camera. The obtaining module 901 can also be referred to as an obtaining unit, an obtaining means, an obtaining circuit, means for obtaining, etc. The obtaining module 901 can be comprised in a processor 903 of the vehicle system. In some embodiments, the obtaining module 901 can be referred to as a receiving module.

The vehicle system is adapted to, e.g., by means of a correcting module 905, correct at least a part of distortions in the image to obtain a corrected image. The correcting module 905 can also be referred to as a correcting unit, a correcting means, a correcting circuit, means for correcting, etc. The correcting module 905 can be comprised in the processor 903 of the vehicle system.

The vehicle system is adapted to, e.g. by means of a transforming module 908, rotationally transform the corrected image using a first rotational transformation to obtain a first transformed image. The transforming module 908 may also be referred to as a transforming unit, a transforming means, a transforming circuit, means for transforming etc. The transforming module 908 may be or comprised in the processor 903 of the vehicle system.

The vehicle system is adapted to, e.g., by means of the transforming module 908, rotationally transform the corrected image using a second rotational transformation to obtain a second transformed image. The first and second rotational transformations are different from each other, in that the first and second transformed images are consecutive or adjacent images. The first transformed image can be mapped on one planar surface and the second transformed image can be mapped on another planar surface.

The vehicle system can be adapted to, e.g., by means of a removing module 910, remove redundant overlapping areas from at least one of the first and second transformed images. The removing module 910 can also be referred to as a removing unit, a removing means, a removing circuit, means for removing, etc. The removing module 910 can be comprised in the processor 903 of the vehicle system.

The vehicle system can be adapted to, e.g., by means of a providing module 913, provide the first and second transformed images as input to another vehicle system for further processing. The providing module 911 can also be referred to as a providing unit, a providing means, a providing circuit, means for providing, etc. The providing module 913 can be comprised in the processor 903 of the vehicle system. In some embodiments, the providing module 913 can be referred to as a transmitting module.

The vehicle system can be adapted to, e.g., by means of a displaying module 915, display at least one of the first and second transformed images to a user 110 of the vehicle 100.

The images can be displayed on a display in the vehicle 100. The displaying module 915 can also be referred to as a displaying unit, a displaying means, a displaying circuit, means for displaying, etc. The displaying module 915 can be comprised in the processor 903 of the vehicle system.

In some embodiments, the vehicle system includes the processor 903 and a memory 918. The memory 918 stores instructions executable by the processor 903. The memory 918 can include one or more memory units. The memory 918 is arranged to be used to store data, received data streams, power level measurements, images, parameters, distortion information, transformation information, vehicle information, vehicle surrounding information, threshold values, time periods, configurations, schedulings, and applications to perform the methods herein when being executed by the vehicle system.

The embodiments herein for handling images of the surroundings of a vehicle 100 can thus be implemented through one or more processors, such as a processor 903 in the vehicle system arrangement depicted in FIG. 9, together with computer program code for performing the functions of the embodiments herein. The processor can be, for example, a Digital Signal Processor (DSP), an Application Specific Integrated Circuit (ASIC) processor, a Field-Programmable Gate Array (FPGA) processor, or a microprocessor. The program code mentioned above can also be provided as a computer program product, for instance in the form of a data carrier carrying computer program code for performing the embodiments herein when being loaded into the vehicle system. One such carrier can be in the form of a CD ROM disc. It is however feasible with other data carriers, such as a memory stick. The computer program code can furthermore be provided as pure program code on a server and downloaded to the vehicle system. A computer program can include instructions which, when executed on at least one processor, cause the at least one processor to carry out the method described above. A carrier can include the computer program, and the carrier may be one of an electronic signal, an optical signal, a radio signal, or a computer readable storage medium.

Those skilled in the art will also appreciate that the obtaining module 901, the correcting module 905, the transforming module 908, the removing module 910, the providing module 913, and the displaying module 915 described above can refer to a combination of analog and digital circuits, and/or one or more processors configured with software and/or firmware, e.g., stored in a memory, that when executed by the one or more processors, such as the processor 903, perform as described above. One or more of these processors, as well as the other digital hardware, can be included in a single ASIC, or several processors and various digital hardware can be distributed among several separate components, whether individually packaged or assembled into a system-on-a-chip (SoC).

The following terminologies are used interchangeably herein: "de-warping", "undistortion", and "mapping". These all describe the process of some geometric transformation of an image, usually from the two-dimensional (2D) images captured by the image capturing device 105 to at least two planar images that do not have distortion effects introduced by the image capturing device 105.

"Computer vision and machine learning algorithms" refer to general algorithms that use images captured by the image capturing device 105 as input, and output decisions that are relevant for DA and/or AD, based on machine learning/ artificial intelligence technology. Some examples are lane marking detection, vehicle detection, pedestrian detection, distance measurement, etc.

Directions as used herein, e.g., horizontal, vertical, and lateral relate to when the vehicle system is mounted in the vehicle 100, which stands on essentially flat ground. The vehicle system can be manufactured, stored, transported, and sold as a separate unit. In that case, the directions may differ from when mounted in the vehicle 100.

The present invention thus provides systems and methods for vehicle lane marking and other object detection using side fisheye cameras and three-fold de-warping. Three-fold de-warping is applied to a side fisheye camera image to create straight, rectilinear side, front, and rear camera images that are readily displayed and understood by a vehicle occupant and/or processed as a suitable dataset for an AI algorithm in a DA or AD system. This three-fold de-warping of the side fisheye camera image preserves field of view, such that all surrounding lane markings and other objects can be viewed and/or detected. Advantageously, the side fisheye camera image is typically not obscured by low-standing sun or glare conditions (at least not on both sides of a vehicle), and can be used when the vehicle is traveling towards or away from the sun or glare source, as a replacement for or complement to the typical front or rear camera methodologies. The three-fold de-warped, straight, rectilinear side, front, and rear camera images obtained from the side fisheye camera image are ideally suited for use as a dataset for any variety of AI algorithms, again as a replacement for or complement to the typical front or rear camera methodologies. Thus, the systems and methods for vehicle lane marking and other object detection using side fisheye cameras and three-fold de-warping provided herein can be used as a replacement or substitute for conventional front or rear camera methodologies depending upon vehicle operating and camera visibility conditions, or can be used as a verification of or complement to such conventional front or rear camera methodologies.

Figure 10:
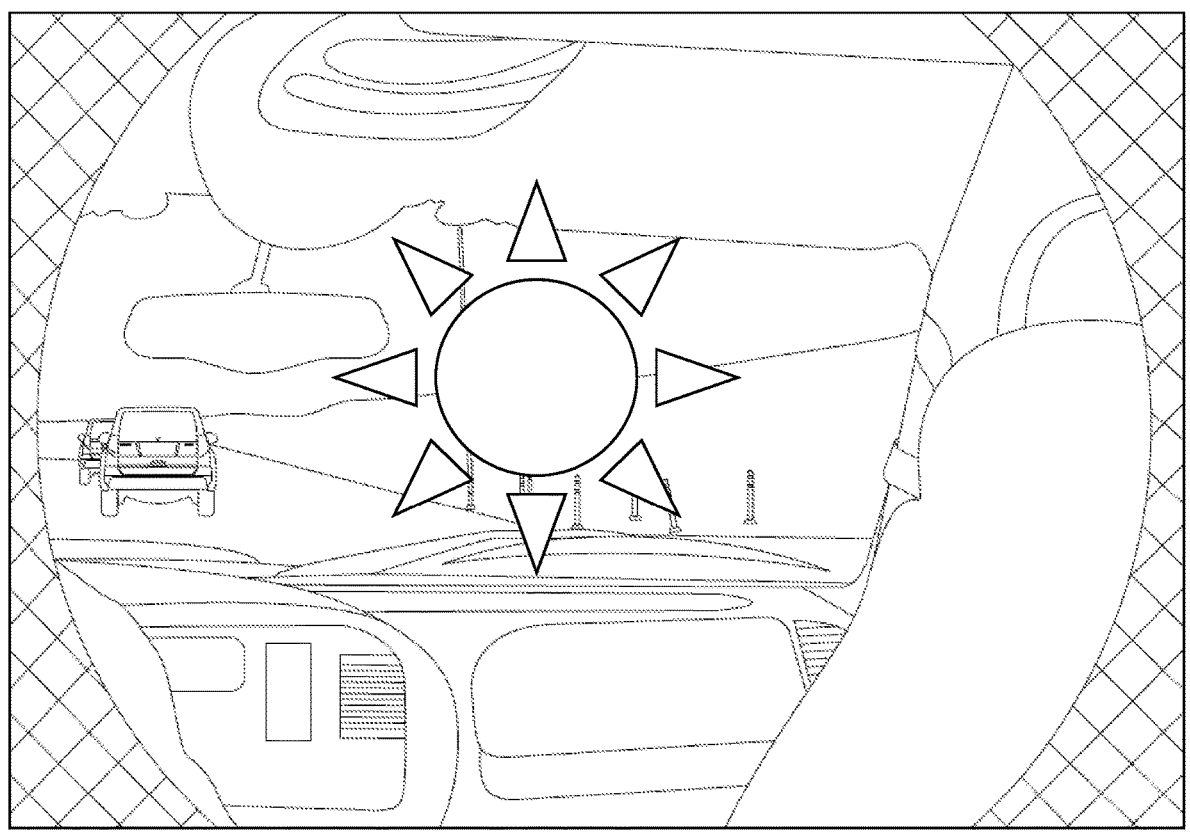
FIG. 10 is a schematic diagram illustrating a front camera image obscured by low-standing sun.

FIG. 10 shows a front view out of a vehicle with low standing sun causing a glare that can prevent conventional front camera images from being used to detect lane markings and other objects surrounding the vehicle. Under such conditions, the vehicle system can default to the use of one or both side fisheye cameras to obtain images used to detect such lane markings an other objects, via the process described in detail above. The side fisheye camera(s) can also be used as a substitute for, as a complement to, or as a confirmation for the conventional front camera under normal, non-obscured conditions as well.

Figure 11A:
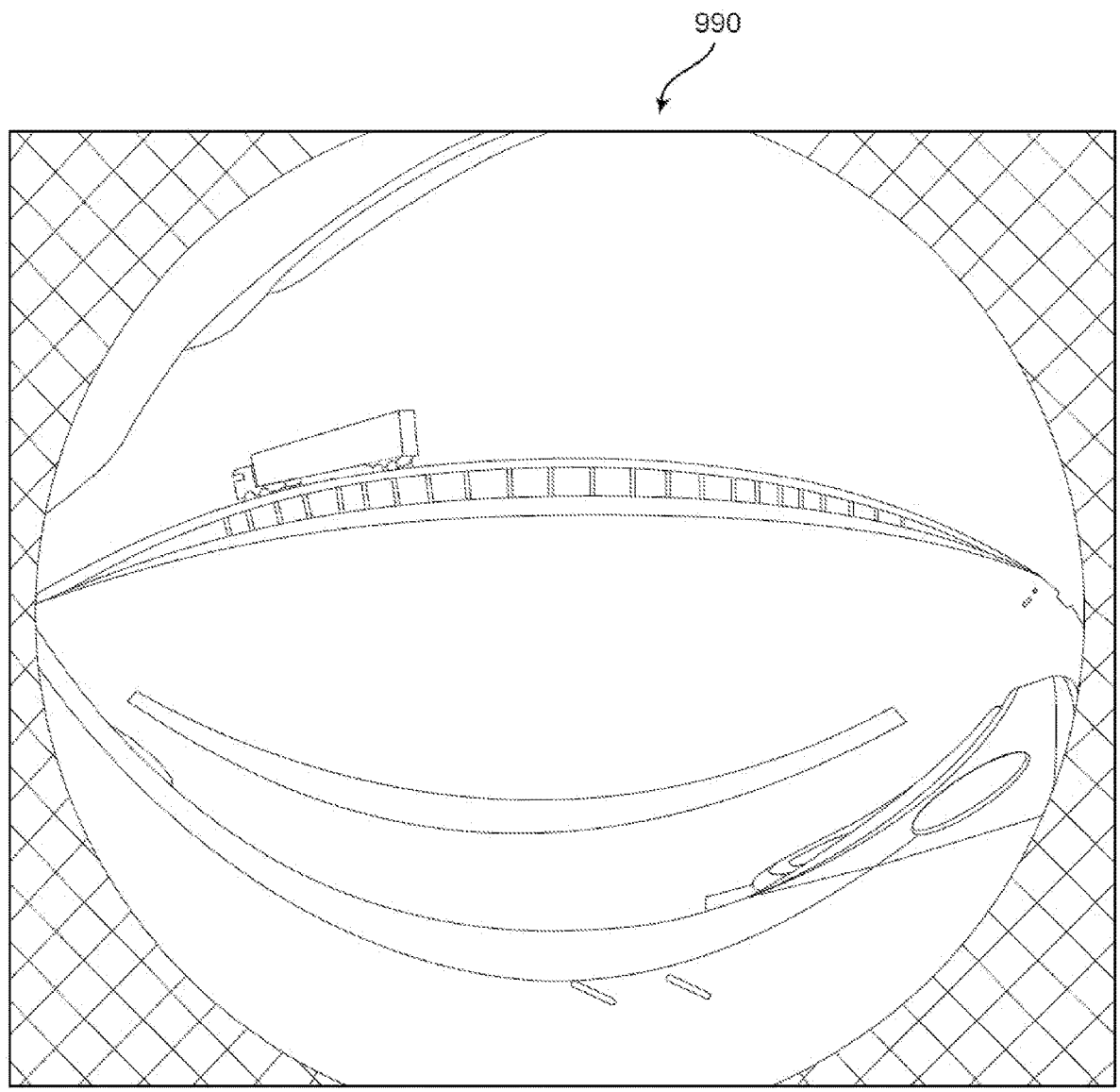
FIG. 11a is a schematic diagram illustrating a side fisheye camera image that is three-fold de-warped used for lane marking detection using the systems and methods provided herein.

FIG. 11a shows a resulting side fisheye camera image 990 prior to processing. It can be seen that the lane markings are curved, which is not preferred for vehicle occupant display and/or AI/ML processing, however the lane markings are not obscured by the sun, and typically will not be, at least not on both sides of a vehicle simultaneously. This side fisheye camera image 990 is then processed as described in detail above.

Figure 11B:
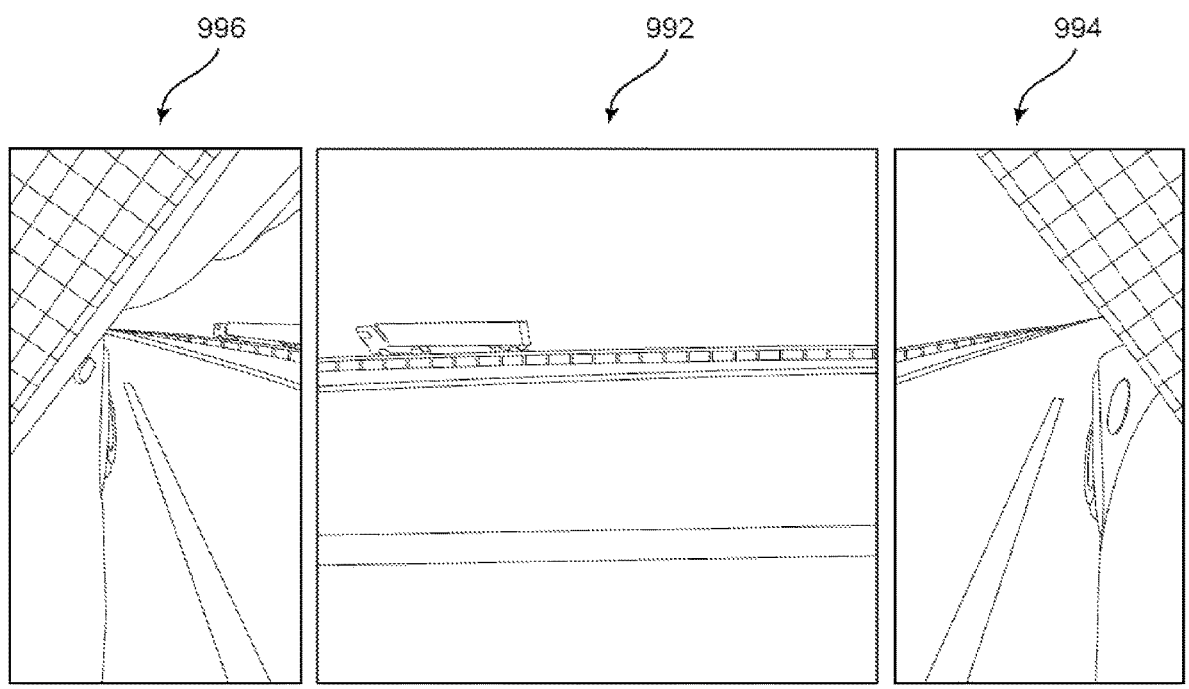
FIG. 11b is a schematic diagram illustrating three-fold de-warped side, front, and rear rectilinear images used for lane marking detection using the systems and methods provided herein.

FIG. 11b shows the result, with side 992, front 994, and rear 996 views generated from the side fisheye camera image 990 (FIG. 11a), with all such views including accurate and undistorted straight lane markings that are ideally suited for vehicle occupant display and/or AI/ML processing.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. A method of handling images of surroundings of a vehicle, the method comprising:
   obtaining an image or successive images of the surroundings of the vehicle, wherein the image or successive images are obtained from at least one side image capturing device mounted in or on the vehicle at a point in time or over a period of time, and wherein the at least one side image capturing device comprises a curvilinear camera lens;
   correcting at least a part of distortions in the image or successive images to obtain a corrected image or corrected successive images;
   rotationally transforming a first sub-image of the corrected image or a first image of the corrected successive images using a first rotational transformation to obtain a first transformed image;
   rotationally transforming a second sub-image of the corrected image or a second image of the corrected successive images using a second rotational transformation to obtain a second transformed image, wherein the first and second transformed images are thus adjacent transformed sub-images or transformed successive images;
   performing object detection using the first transformed image;
   performing object detection using the second transformed image; and
   combining the object detection for the first transformed image and the object detection for the second transformed image to perform object detection for the image or successive images as a whole.

2. The method according to claim 1, wherein the step of obtaining the image or successive images of the surroundings of the vehicle using the at least one side image capturing device is performed after determining that one of a front or a rear image capturing device is obscured.

3. The method according to claim 1, wherein the step of obtaining the image or successive images of the surroundings of the vehicle using the at least one side image capturing device is performed simultaneously with a step of obtaining another image or other successive images of the surroundings of the vehicle using at least one of a front or a rear image capturing device.

4. The method according to claim 1, wherein the surroundings of the vehicle include one or more lane markings.

5. The method according to claim 4, wherein the first and second transformed images are provided to an artificial intelligence algorithm operable for performing lane marking detection using the first and second transformed images.

6. The method according to claim 1, further comprising removing redundant overlapping areas from at least one of the first and second transformed images.

7. The method according to claim 1, wherein the first transformed image is mapped on one planar surface and the second transformed image is mapped on another planar surface.

8. The method according to claim 1, further comprising displaying at least one of the first and second transformed images to a user of the vehicle.

9. A non-transitory computer readable medium comprising instructions stored in a memory and executed by a processor to carry out the steps comprising:
   obtaining an image or successive images of the surroundings of the vehicle, wherein the image or successive images are obtained from at least one side image capturing device mounted in or on the vehicle at a point in time or over a period of time, and wherein the at least one side image capturing device comprises a curvilinear camera lens;
   correcting at least a part of distortions in the image or successive images to obtain a corrected image or corrected successive images;
   rotationally transforming a first sub-image of the corrected image or a first image of the corrected successive images using a first rotational transformation to obtain a first transformed image;
   rotationally transforming a second sub-image of the corrected image or a second image of the corrected successive images using a second rotational transformation to obtain a second transformed image, wherein the first and second transformed images are thus adjacent transformed sub-images or transformed successive images;
   performing object detection using both the first transformed image;
   performing object detection using the second transformed image; and
   combining the object detection for the first transformed image and the object detection for the second transformed image to perform object detection for the image or successive images as a whole.

10. The non-transitory computer-readable medium according to claim 9, wherein the step of obtaining the image or successive images of the surroundings of the vehicle using the at least one side image capturing device is performed after determining that one of a front or a rear image capturing device is obscured.

11. The non-transitory computer-readable medium according to claim 9, wherein the step of obtaining the image or successive images of the surroundings of the vehicle using the at least one side image capturing device is performed simultaneously with a step of obtaining another image or other successive images of the surroundings of the vehicle using at least one of a front or a rear image capturing device.

12. The non-transitory computer-readable medium according to claim 9, wherein the surroundings of the vehicle include one or more lane markings.

13. The non-transitory computer-readable medium according to claim 12, wherein the first and second transformed images are provided to an artificial intelligence algorithm operable for performing lane marking detection using the first and second transformed images.

14. The non-transitory computer-readable medium according to claim 9, the method further comprising the step of removing redundant overlapping areas from at least one of the first and second transformed images.

15. The non-transitory computer-readable medium according to claim 9, wherein the first transformed image is mapped on one planar surface and the second transformed image is mapped on another planar surface.

16. The non-transitory computer-readable medium according to claim 9, the method further comprising the step of displaying at least one of the first and second transformed images to a user of the vehicle.

17. A system for handling images of surroundings of a vehicle, the system comprising:
- at least one side image capturing device mounted in or on the vehicle operable for obtaining an image or successive images of the surroundings of the vehicle at a point in time or over a period of time, wherein the at least one side image capturing device comprises a curvilinear camera lens;
- a correcting module executed on a processor operable for correcting at least a part of distortions in the image or successive images to obtain a corrected image or corrected successive images;
- a transforming module executed on the processor operable for rotationally transforming a first sub-image of the corrected image or a first image of the corrected successive images using a first rotational transformation to obtain a first transformed image;
- the transforming module executed on the processor operable for rotationally transforming a second sub-image of the corrected image or a second image of the corrected successive images using a second rotational transformation to obtain a second transformed image, wherein the first and second transformed images are thus adjacent transformed sub-images or transformed successive images; and
- a processing module executed on the processor operable for:
  - performing object detection using the first transformed image;
  - performing object detection using the second transformed image; and
  - combining the object detection for the first transformed image and the object detection for the second transformed image to perform object detection for the image or successive images as a whole.

18. The system according to claim 17, wherein obtaining the image or successive images of the surroundings of the vehicle using the at least one side image capturing device is performed after determining that one of a front or a rear image capturing device is obscured.

19. The system according to claim 17, wherein obtaining the image or successive images of the surroundings of the vehicle using the at least one side image capturing device is performed simultaneously with obtaining another image or other successive images of the surroundings of the vehicle using at least one of a front or a rear image capturing device.

20. The system according to claim 17, wherein the surroundings of the vehicle include one or more lane markings, and wherein the first and second transformed images are provided to an artificial intelligence algorithm operable for performing lane marking detection using the first and second transformed images.

* * * * *